Patented May 5, 1953

2,637,733

UNITED STATES PATENT OFFICE 2,637,733

ETHYLENE-BRIDGED DIBENZANTHRONE COMPOUNDS AND PROCESS FOR THEIR PREPARATION

James M. Straley, Kingsport, Tenn., assignor to Eastman Kodak Company, Rochester, N. Y., a corporation of New Jersey No Drawing. Original application April 4, 1950, Serial No. 153,996. Divided and this application June 1, 1951, Serial No. 229,543

3 Claims. (Cl. 260—353)

This invention relates to a process for preparing condensation products of the benzanthrone series and to certain of the benzanthrone compounds as new compounds.

In accordance with the process of my invention a 10-methyleneanthrone compound which is unsubstituted in at least one of the 4- and 5-positions is condensed with 1,3-cyclohexadiene to obtain new valuable vat dye intermediates which are probably Bz 2, Bz 2'-ethylene-bridged-dibenzanthronyl compounds. These latter compounds are fused by means of KOH or NaOH to form new vat dye compounds which in turn are oxidized to form the final vat dye products of my new process.

10-methyleneanthrone has the probable formula:

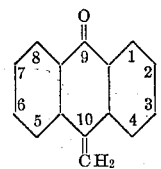

The numbering given is that employed herein.

It is an object of my invention to provide new valuable vat dye intermediates which are probably Bz 2, Bz 2'-ethylene-bridged dibenzanthronyl compounds. Another object is to provide new valuable vat dyes which are probably dibenzanthrone compounds in which the 16- and 17-positions are bridge by an ethylene linkage. A further object is to provide valuable vat dyes which are probably dibenzanthrone compounds in which the 16- and 17-positions are bridged by a —CH=CH— linkage. Another object is to provide a satisfactory process for the preparation of the compounds of the invention.

In carrying out the process of the invention a 10-methyleneanthrone compound which is unsubstituted in at least one of the 4- and 5-positions is condensed with 1,3-cyclohexadiene in the presence of a mild oxidizing agent such as oxygen and nitrohydrocarbons and their derivatives. A number of the nitrohydrocarbon type of oxidizing agents are disclosed hereinafter. Nitroalkanes, aqueous solutions of nitrobenzene sulfonic acids and aromatic nitrocompounds differ only in degree and not in kind of influence. Although nitroalkanes such as nitromethane, nitroethan, n-nitropropane ($CH_3CH_2CH_2NO_2$) and n-nitrobutane ($CH_3CH_2CH_2CH_2NO_2$), for example, and although nitrobenzene sulfonic acids such as o-nitrobenzene sulfonic acid, m-nitro-benzene sulfonic acid and p-nitrobenzene sulfonic acid, for example, can be used, I prefer to employ aromatic nitrohydrocarbons such as nitrobenzene, o-nitrotoluene, m-nitrotoluene, p-nitrotoluene, a nitro xylene such as 2-nitro-1,3-dimethylbenzene, 4 - nitro - 1,2-dimethylbenzene, etc.; α-nitronaphthalene, β-nitronaphthalene and α-nitromethylnaphthalene, for example.

The use of a strong oxidizing agent, such as potassium permanganate, nitric acid or potassium dichromate, for example, should be avoided in this phase of my invention. If strong oxidizing agents were used, particularly at high temperatures, side reactions would occur, due to either the ease of oxidizing methyleneanthrone compounds to anthraquinone compounds or possible destruction of the desired reaction product, thereby seriously lowering the yield.

The reaction temperature does not appear to be critical as the products can be obtained at ordinary temperatures as well as at high temperatures. Temperatures of from about 25° C. to about 200° C., for example, can be employed. Temperatures of from about 175° C. to about 195° C. appear most suitable and are preferred. Where low temperatures are employed, a longer reaction time is required. Temperatures in excess of 200° C. appear to reduce the yield and to cause contamination, apparently by polymerization of the methyleneanthrone competing with the desired addition reaction.

The reaction, as illustrated with reference to 10-methyleneanthrone, is believed to proceed as follows:

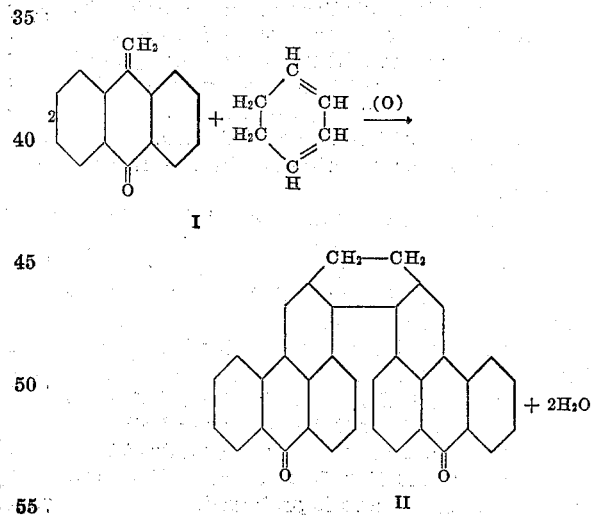

10-methyleneanthrone compounds that can be employed include, for example, 10-methyleneanthrone, 10 - methylene - 2 - chloroanthrone, 10-methylene-1-methylanthrone, 10-methylene-4-bromoanthrone, 10-methylene-1-fluoroanthrone, 10-methylene-3-methylanthrone, 10-methylene-3-chloroanthrone, 10 - methylene-2-methylanthrone and 10-methylene-1-chloroanthrone.

As previously indicated, by the action of caustic alkali such as KOH or NaOH upon the new vat dye intermediates of the invention, new vat dye compounds are obtained. This reaction, as illustrated with reference to the unsubstituted vat dye intermediate is believed to take place as follows:

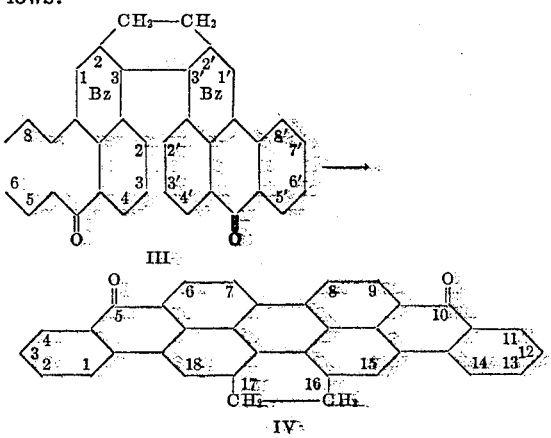

The 2 and 2' positions of the starting compound must be unsubstituted. By the use of a starting compound which is substituted, for example, with a chlorine atom, a bromine atom, a fluorine atom or a methyl group substituted vat dye compounds are obtained. The positions of the substituent or substituents in the vat dye obtained are determined by the position or positions occupied by the substituent or substituents in the starting compound.

The new vat dye compounds which in their unsubstituted form have the probable formula IV are easily obtained by introducing the new intermediates which in their unsubstituted form have the probable formula III into melts of KOH or NaOH at temperatures of from about 105° C. to about 160° C. While any of the standard conditions of caustic fusions used in the vat dye industry appear to be suitable, the use of ethyl or methyl alcohol potassium hydroxide melts at temperatures of about 130° C. to about 155° C. appears advantageous and is preferred.

The new vat dye compounds thus obtained dye cotton well from a hot, strongly alkaline vat. The dyeings obtained are attractive shades of blue and possess excellent wash-fastness. However, as explained hereinafter, these new vat dye compounds which will be referred to herein as intermediate vat dye compounds are readily converted to more permanent dyestuffs, i. e., the final products of the present invention.

The final products of the invention are obtained by oxidizing the intermediate vat dye compounds which in their unsubstituted form have the formula IV. The oxidation can be carried out in a number of ways. Thus oxidation can be effected by heating the intermediate vat dye in air at temperatures above 160° C. either en masse or on the fiber. The final products can also be obtained by incorporating an oxidizing agent into the caustic alkali melts used in the formation of the intermediate vat dye compounds or the intermediate vat dye compounds can be oxidized to the final vat dye products by means of chemical oxidizing agents. Further, exposure to strong ultraviolet light, such as that used in apparatus for testing the light fastness of dyeings, will also effect the transformation of the intermediate vat dye compounds to the final products.

The conversion of the new intermediate vat dye compounds to the final vat dye compounds is illustrated by the following equation wherein an unsubstituted intermediate vat dye compound is employed as the starting compound:

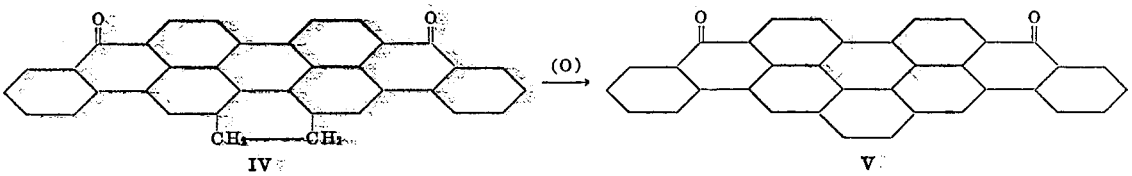

It is to be clearly understood that the final products may contain substituents and it is here noted, for example, that the halogenated vat dye compounds of Examples 16 and 18 give a more pleasing shade of red than the corresponding unsubstituted vat dye compound.

The following examples illustrate the compounds of our invention and the manner in which the process of our invention is carried out. Parts are expressed as parts by weight.

PREPARATION OF VAT DYE INTERMEDIATES

Example 1

A solution of 20.6 parts of 10-methyleneanthrone and 4 parts of 1,3-cyclohexadiene in 110 parts of nitrobenzene were shaken at room temperature for three weeks. The reaction mixture was then filtered and the solid collected on the filter was washed with ethyl alcohol. A bright yellow solid melting above 360° C. was obtained. Microscopic examination discloses that the product thus obtained has flat, long dichroic crystals.

It probably has the formula numbered II. The yield of product was about 20%.

*Example 2*

10 parts of 10-methyleneanthrone, 2 parts of 1,3-cyclohexadiene, 40 parts of acetic acid and 5 parts of acetic anhydride were refluxed together for 6 hours after which the reaction mixture was cooled and filtered. The reaction product was recovered on the filter and dried. The product obtained was the same as that obtained in Example 1. The yield of product was about 35%.

*Example 3*

40 parts of 10-methyleneanthrone in 200 parts of nitrobenzene were heated to 180° C. 12 parts of 1,3-cyclohexadiene in 20 parts of nitrobenzene were gradually added over a period of 30 minutes with stirring at a temperature of 185° C.–190° C. The temperature was maintained at 180° C.–190° C. for 3.5 hours longer, after which 4 parts of 1,3-cyclohexadiene were added and the reaction mixture refluxed for 1 hour. The reaction mixture was then cooled to 80° C., diluted with an equal volume of ethyl alcohol (methyl alcohol can also be used), allowed to cool to room temperature and then filtered. A heavy crop of bright yellow crystals having the same properties and formula as the product of Example 1 was obtained. The yield of product was about 68%. A solution of the product in concentrated sulfuric acid has a bluish-red color.

*Example 4*

20 parts of a methyl methyleneanthrone prepared from the 2-methylanthrone of Ber. 38, 1792 (1905) were heated and stirred at 170° C.–180° C. with 5 parts of 1,3-cyclohexadiene in 80 parts of o-nitrotoluene for 6 hours. The reaction mixture was then cooled to 80° C., diluted with an equal volume of ethyl alcohol (methyl alcohol can also be used), allowed to cool to room temperature and then filtered. The product obtained is a yellow-brown powder melting above 360° C. and soluble in concentrated sulfuric acid with a red color.

*Example 5*

22 parts of a 10-methylene-dichloroanthrone prepared from 1,4-dichloroanthrone (Ber. 62, 1971 (1929)) were heated and stirred at 170° C.–180° C. with 5 parts of 1,3-cyclohexadiene in 80 parts of o-nitrotoluene for 6 hours. The reaction mixture was then cooled to 80° C., diluted with an equal volume of ethyl alcohol (methyl alcohol can also be used), allowed to cool to room temperature and then filtered. The product obtained is a brown amorphous material subliming with some decomposition at about 360° C.

*Example 6*

20 parts of a 10-methylenechloroanthrone (probably 10-methylene-1-chloroanthrone), prepared from 1-chloro-9-anthrone (J. C. S. 123, 2553), in 100 parts of nitrobenzene were heated to 180° C. 6 parts of 1,3-cyclohexadiene in 10 parts of nitrobenzene were gradually added over a period of 30 minutes with stirring at a temperature of 185° C.–190° C. The temperature was maintained at 180° C.–190° C. for 3.5 hours longer, after which 4 parts of 1,3-cyclohexadiene were added and the reaction mixture refluxed for 1 hour. The reaction mixture was then cooled to 80° C., diluted with an equal volume of ethyl alcohol, allowed to cool to room temperature and then filtered to recover the desired reaction product. The product obtained is a yellow powder dissolving in concentrated sulfuric acid with a red color.

*Example 7*

20 parts of a 10-methylenemethylanthrone (probably 10-methylene-1-methylanthrone) prepared from 1-methyl-9-anthrone were reacted with 5 parts of 1,3-cyclohexadiene exactly in accordance with the procedure described in Example 4. A brown product was obtained.

PREPARATION OF INTERMEDIATE VAT DYES

*Example 8*

100 parts of the condensation product of 10-methyleneanthrone and 1,3-cyclohexadiene obtained as in Examples 1, 2 or 3 were gradually added over a period of about 20 minutes at 125° C.–130° C. to a smooth melt prepared from 500 parts of flake potassium hydroxide and 500 parts of ethyl alcohol. The temperature was allowed to rise to 140° C. in about 30 minutes by distillation of the alcohol. The temperature was held at 140° C.–145° C. for 2 hours after which the reaction mixture was drowned in water and air-blown at 95° C. to isolate the dyestuff. About 90–95 parts of a blue powder, dissolving in concentrated sulfuric acid with a cherry-red color and a slight blue-red fluorescence, were obtained. With alkaline hydrosulfite it forms a reddish-violet vat and cotton dyed therein is colored a pleasing blue after air-oxidation and soaping.

*Example 9*

100 parts of the product of Example 7 were treated exactly in accordance with the procedure described in Example 8. The product obtained is a blue powder which dyes cotton from an alkaline hydrosulfite vat blue shades which are slightly duller than those obtained with the dye product of Example 8.

*Example 10*

20 parts of the product of Example 5 were heated in a melt of 100 parts of KOH and 100 parts of ethyl alcohol at 125° C.–135° C. for 3.5 hours. The melt was then drowned in water and the dyestuff formed by the reaction was isolated by air-blowing and filtering. It dyes cotton greenish-blue shades from an alkaline hydrosulfite vat. From the behavior of the dyeings toward acid and alkali, it is believed that at least some of the chlorine atoms initially present in the product of Example 5 have been replaced by hydroxyl groups. This replacement is believed to take place during the fusion operation of this example.

PREPARATION OF FINAL PRODUCTS

*Example 11*

17 parts of the condensation product obtained as described in Example 3 were added at 130° C.–135° C. to a melt prepared from 150 parts of potassium hydroxide and 150 parts of ethyl alcohol. The reaction mixture was then heated to 150° C. and 20 parts of sodium nitrite were added. The temperature rose sharply and after the reaction had subsided, the reaction mixture was drowned in water, blown with air and filtered. 15.5 parts of a reddish-brown powder, dissolving to a violet solution in concentrated sulfuric acid without fluorescence was obtained. It dyes cotton from a blue vat a rather dull red or reddish-bordeaux color which is very fast, especially with respect to light.

Example 12

17 parts of the condensation product obtained as described in Example 3 were treated exactly as described in Example 11 except that 20 parts of potassium chlorate were used in place of sodium nitrite. The same dyestuff was obtained.

Example 13

17 parts of the condensation product obtained as described in Example 3 were added at 130° C.–135° C. to a melt prepared from 150 parts of potassium hydroxide and 150 parts of ethyl alcohol. The reaction mixture was then heated to 150° C.–155° C. and maintained at this temperature, while stirring, for 2 hours. Following this, the reaction mixture was drowned in water, blown with air and filtered to obtain a blue vat dyestuff which was suspended in about 50 parts of water. 30 parts of sodium hypochlorite solution (about 5% active chlorine) were added to the dye suspension and the reaction mixture was brought to 90° C.–95° C. and maintained at this temperature for 3 to 4 hours with good stirring. The bright reddish-brown dyestuff formed was recovered by filtration, washed with water and dried. A yield of 14.9 parts of apparently the identical product of Examples 11 and 12 was obtained.

The reaction can be carried out equally well using a mixture of sodium chlorate and hydrochloric acid in place of sodium hypochloride.

Example 14

A sample of the blue dyestuff obtained as described in Example 9 was finely ground and heated in the air for 8 to 10 hours at 190° C.–200° C. The color changed slowly to a reddish-brown. The product obtained dyes cotton from a blue-vat a reddish-bordeaux color which is very fast, especially with respect to light.

Example 15

A swatch of cotton fabric dyed with the product of Example 8 was placed in a Fadeometer and exposed until the color of the fabric changed to that obtained by dyeing a cotton fabric from a vat with the dyestuff of Example 13. This requires 19 to 24 hours depending upon the concentration of the dyeing. The reddish dyeing so produced matches in light-fastness the dyeings obtained with the dyestuff of Example 13.

Example 16

10 parts of the dyestuff obtained as described in Example 13 were dissolved in 200 parts of chlorosulfonic acid at 20–25° C. 5 parts of bromine and 0.03 parts of sulfur were added and the reaction mixture was stirred for 16 hours at 25° C.–30° C. The color changed from violet to red-brown. The reaction mixture was then diluted with 200 parts of concentrated $H_2SO_4$ (sp. gr. 1.83) and poured onto ice. The precipitated reaction product which is a vat dyestuff containing bromine was recovered by filtration, washed with water and made into a paste. The vat of the product was slightly greener and the final dyeing on cotton much redder than that of the starting material.

Example 17

50 parts of the dyestuff obtained as described in Example 13 were finely ground and suspended in 300 parts of nitrobenzene at 50° C. 40 parts of nitric acid (sp. gr. 1.49) were added and the reaction mixture was stirred for several hours at 60° C.–80° C. Then the reaction mixture was poured into alkaline water and the nitrobenzene was removed by steam distillation. The reaction mixture was then filtered and the reaction product recovered on the filter washed with water and dried. A yield of 52 parts of a nitrated vat dyestuff was obtained in the form of a dark powder. It vat dyed cotton a rather dull violet. The light-fastness of the dyeings obtained on cotton was excellent.

Example 18

20 parts of the product obtained as described in Example 14 were refluxed and stirred under an efficient condenser with 20 parts of bromine, 500 parts of trichlorobenzene and 0.1 part of iodine for 4 hours. The reaction mixture was cooled, filtered, and the product recovered on the filter was washed with benzene. A yield of 16 parts of a bromine containing vat dyestuff which gives a much bluer solution in concentrated $H_2SO_4$ (sp. gr. 1.83) and a redder dyeing on cotton than does the starting material was obtained.

Dyeing with the vat dye compounds of the invention is performed according to the usual strong-alkali vat procedure. Dyeing can be carried out as follows:

0.05 gram of dyestuff are well ground with a few drops of Monopol oil (sulfonated castoroil) and rinsed into a dye-bath. The dye-bath is brought to a total volume of 100 cc., using soft water, and 0.5–1 gram of NaOH and 0.75–1 gram of sodium hydrosulfite are added. The temperature of the dye-bath is raised to 50° C. and 5 grams of a well wet-out cotton goods are entered and dyed at 50° C.–55° C. for 1 hour. The dyed cloth is removed, rinsed and hung in air until oxidation is complete. The dyeings are finished by a 20 minute boil in a 0.5% aqueous sodium carbonate solution, rinsing with water and drying.

While the manner in which my new vat dye compounds are applied to cotton, for example, constitutes no part of my invention, it will be understood that the dyeing procedure given above is merely illustrative and not limitative of the manner in which they may be applied to cotton goods.

While methyleneanthrone and a number of substituted methyleneanthrone compounds are known compounds, it is here noted that methyleneanthrone can be prepared as described by K. H. Meyer, Liebigs Annalen, vol. 420, page 135 (1920). Substituted methyleneanthrone compounds can be prepared by the method just referred to for the preparation of methyleneanthrone by the use of a substituted anthrone compound in place of anthrone.

This application is a division of my copending application Serial No. 153,996, filed April 4, 1950.

I claim:

1. The compounds having the formula:

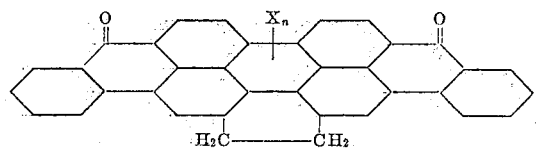

wherein X represents a member selected from the group consisting of a hydrogen atom, a chlorine atom, a bromine atom, a fluorine atom and a methyl group, and $n$ represents a small whole number selected from the group consisting of 1 and 2.
2. The compounds having the formula:
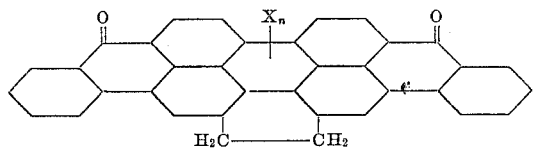
wherein X represents a chlorine atom and $n$ is 2.
3. The compound which has the formula:
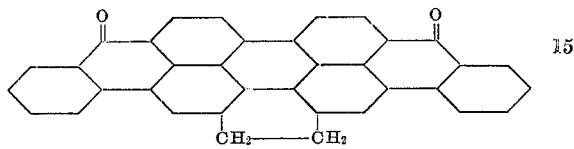
JAMES M. STRALEY.
References Cited in the file of this patent
UNITED STATES PATENTS
| Number | Name | Date |
|---|---|---|
| 1,736,084 | Kranzlein et al. | Nov. 19, 1929 |
| 1,899,579 | Luttringhaus et al. | Feb. 28, 1933 |
| 1,909,385 | Wvertz | May 16, 1933 |
| 1,978,062 | Scheyer | Oct. 23, 1934 |
| 2,282,250 | Schlichting et al. | May 5, 1942 |